Jan. 7, 1964
E. A. HARPER
3,117,079
STRIPPING OPERATION
Filed Jan. 26, 1961
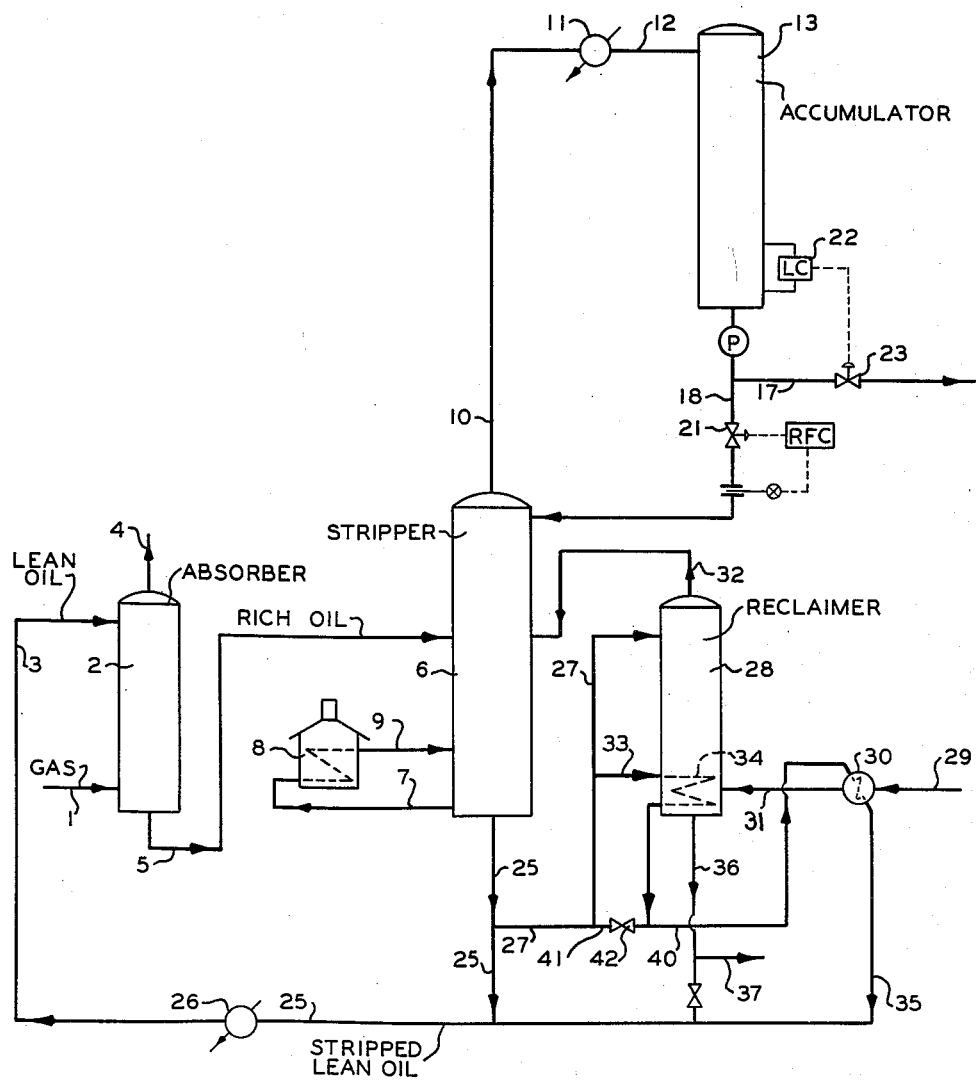
INVENTOR.
E. A. HARPER
BY
Hudson & Young
ATTORNEYS United States Patent Office 3,117,079
Patented Jan. 7, 1964

3,117,079
STRIPPING OPERATION
Ernest A. Harper, Bartlesville, Okla., assignor to Phillips Petroleum Company, a corporation of Delaware
Filed Jan. 26, 1961, Ser. No. 85,030
5 Claims. (Cl. 208—341)

This invention relates to improved stripping operation. This invention also relates to an improved stripping apparatus. In one of its aspects, the invention relates to the removal from a stripped absorption medium of undesirable components therein by passing said medium to a reclaiming zone, in said zone stripping the absorption medium from undesirable components therein by subjecting the same to a stripping action of a normally gaseous hydrocarbon which has been preheated substantially only by the stripping medium taken from the stripping zone. In another of its aspects, the invention relates to an operation as here described in which essentially all of the heat required for the stripping and related operations is supplied by a single heating source which supplies heat to the stripping zone and wherein heat required elsewhere than in the stripping zone is supplied by circulating bottoms from the stripping zone to the place at which required, for example, the zone in which a stripping gas such as propane, etc. is used to strip from the stripped absorption medium which is passed thereto, the absorption medium leaving behind a residual higher molecular weight material which is undesired in the stripping medium. In a further aspect of the invention, it relates to an apparatus comprising, in combination, a heating zone, a stripping zone, and a reclaiming zone, means in combination with the heating and stripping zone for circulating bottoms from the stripping zone to the heating zone back to the stripping zone, means in combination with the stripping zone and the reclaiming zone to circulate bottoms from the stripping zone to the reclaiming zone, means at the reclaiming zone for passing at least a portion of the bottoms into indirect heat exchange with the bottom portion of the reclaiming zone and at least another portion directly into the reclaiming zone as liquid to be treated therein, means for passing at least a portion of said stripping zone bottoms into indirect heat exchange with a stripping fluid being introduced into said reclaiming zone and means for introducing said stripping fluid into said reclaiming zone.

It is known in the art to remove lean oil from a stripping still, for example, a still in which gasoline vapors are stripped from a rich oil obtained from an absorber zone, and to pass said stripped lean oil to a purifying still for purification by passing therethrough steam while also heating the same by indirect contact with additional quantities of steam thus to obtain from the purifying still steam and oil vapors and a residue which is withdrawn from the bottom of the purifying still.

It is also known in the art to pass a rich untreated gas obtained from the feed to an absorber into a still in which the rich untreated gas is injected into hot impure absorption oil to assist in distillation thereof, as disclosed in U.S. Patent 2,339,680, Samuel C. Carney.

It has now been conceived by me that a normally gaseous or vaporizable hydrocarbon stream which can contain, say, propane, butane and/or pentane, can be preheated by indirect heat exchange with the rich absorption oil stripper bottoms and then passed into a purifying still or oil reclaiming zone and used therein to strip the lean oil from the stripper from the contaminants contained therein. More specifically, according to the concept, from the bottom of a heated stripping zone there is passed at least a portion of the stripped lean oil to a heat exchanger in the bottom of the reclaiming zone, another portion is passed independently into the reclaiming zone as the oil to be reclaimed, a portion of the stripping zone bottoms are used to preheat the stripping medium or hydrocarbon gases being passed to the reclaiming zone and then the thus-heated gases are passed into said reclaiming zone. The stripping medium or hydrocarbon gases are substantially pure as compared with the rich gas which enriches the rich absorber oil, disclosed herein. Thus, the stripping medium is substantially free from the impurities contained in the gases or vapors which are treated by absorption with the lean oil to obtain the rich oil.

It is an object of this invention to provide an improved stripping operation. It is a further object of this invention to provide an improved stripping apparatus. It is a still further object of this invention to provide a unitary stripping and oil reclaiming operation in which a single source of heat can be used to provide heat at a plurality of places in the operation. It is a further object of this invention to provide method and means for the recovery of natural gasoline constituents from natural gas in an absorption-stripping operation in which an absorption oil reclaiming step is practiced.

Other aspects, objects and the several advantages of the invention are apparent from a study of this disclosure, drawing and the appended claims.

According to the present invention, a stripped absorption oil is passed from the bottom of a heated stripping still into a reclaiming vessel, the reclaiming vessel being heated by passing at least a portion of said oil into indirect heat exchange with the bottoms in said vessel, passing a portion of said oil into indirect heat exchange with a normally gaseous or vaporizable hydrocarbon, such as LPG, propane or butane, and passing the thus preheated hydrocarbon into the reclaiming zone thus stripping the oil from contaminants contained therein.

Also according to the invention, the lean oil, which is recovered free of contaminants, and the gaseous hydrocarbons are passed very advantageously into the stripper for admixture therein of the gases with the gases eventually leaving the stripper.

Referring now to the drawing, natural gas enters the system by pipe 1 and is passed in absorber 2 into countercurrent absorption flow with lean oil introduced to absorber 2 by pipe 3. Non-absorbed natural gas consisting largely of methane and lighter is taken overhead by pipe 4.

Bottoms from absorber 2 consisting essentially of rich oil containing natural gasoline constituents is passed by pipe 5 to stripper 6. Stripper 6 is heated by passing bottoms therein by pipe 7 through heater 8 and pipe 9 back to the stripper. Overhead from stripper 6 consisting essentially of the natural gasoline constituents passes by pipe 10, cooler 11 and pipe 12 to accumulator 13. A portion of the condensed hydrocarbons from accumulator 13 is passed through line 18 and into the top of stripper 6 to serve as reflux to prevent lean oil from passing out of stripper 6 through line 10. Rate of flow controller 21 maintains a constant rate of flow of reflux through line 18. The remainder of the condensed hydrocarbons from accumulator 13 are passed through line 17 for further processing. Liquid level controller 22 connected to accumulator 13, actuates valve 23 to control the flow of hydrocarbons through line 17 to maintain a constant level in accumulator 13.

Returning now to stripper 6, bottoms are removed by pipe 25 and essentially constitute the lean or stripped absorption oil which is passed by cooler 26 to pipe 3 and back to absorber 2 for reuse. At least a portion of the oil in pipe 25 is passed by pipe 27 into reclaimer 28. LPG, propane or butane or a desired mixture of the hydrocarbons is passed by pipe 29, heat exchanger 30 and pipe 31 into a lower portion of reclaimer 28. The bottom of reclaimer 28 is heated by passing at least a portion of the oil circulating in pipes 25 and 27 through pipe 33 into indirect heat exchange coil 34 located in the foot of reclaimer 28. The oil having passed through coil 34 is passed by pipe 40 into heat exchanger 30 and then pipe 35 to pipe 25 for reuse as already indicated for the oil in pipe 25. A cross-over pipe 41 provided with valve 42 permits independent regulation of the amount of heat furnished to heat exchanger 30 so that, if desired, oil can be passed directly from stripper 6 to heat exchanger 30 for heating the incoming hydrocarbons independently from the amount of oil being passed from stripper 6 by way of pipes 25, 27, and 33 to coil 34.

In reclaimer 28, the lean oil is stripped from contaminants which are removed as bottoms by way of pipe 36 and pipe 37, the valve in pipe 36 being normally closed. The lean oil which is stripped from the impurities contaminating the same is returned by way of pipe 32 to the system.

In one embodiment of the invention, stripper 6, to which rich absorber oil is fed, is operated at a pressure of approximately 150 p.s.i.g., a bottom temperature of approximately 550° F., and a top temperature of approximately 300° F. Bottoms, or lean oil, are pumped at a pressure of approximately 165 p.s.i.g. and at a temperature of approximately 520° F., passing approximately 1525 gallons per day through coil 34 while passing approximately 720 gallons per day into the reclaimer for treatment through pipe 27. There is contained in the bottoms fed to the reclaimer from about three-fourths to about one and one-fourth percent of residual material ultimately removed from the reclaimer by pipes 36 and 37. The reclaimer is operated at approximately 470 to 510° F. and a pressure of about 150 p.s.i.g. There are introduced by pipe 29, approximately 1000 gallons per day of a mixture of propane and butane, butane content of which can vary depending upon conditions elsewhere from about 30 to about 70 percent. Obviously, other contents of butane or, in fact, no butane, can be used within the scope of the invention. In the embodiment being described, the stream contains approximately 60 percent butane and approximately 40 percent propane and is pumped through heat exchanger 30 in which the temperature of the stream is raised approximately to 480° F. at a pressure of approximately 120 pounds p.s.i.g. As a result of the operation of the reclaimer, 32,700 cubic feet per day of gases and vapor pass by pipe 32 to stripper 6.

In the reclaimer, the residue is concentrated in the embodiment until it reaches approximately only 50 percent lean oil, the remainder being higher boiling material, at which time oil flow into the reclaimer is stopped and the residue further concentrated, as described, to contain approximately only 25–35 percent lean oil, following which the residue is removed. In the operation described, the residue is removed about once every eight hours.

One skilled in the art in possession of this disclosure, having studied the same, will understand that it is within the scope of the invention to continuously remove residue from the reclaimer and, if desired, to further concentrate it elsewhere. Or, the reclaimer can be otherwise operated to effect a continuous withdrawal of a higher or lower concentration of lean oil in the residue.

The embodiment above described is based upon a feed of 70 gallons per minute of lean oil to absorber 2 to which is fed 25,000,000 cubic feet natural gas per day.

Reasonable variation and modification are possible within the scope of the foregoing disclosure, drawing and the appended claims to the invention, the essence of which is that there have been provided a unitary method and apparatus for the reclaiming of absorption oil from a stripped absorption oil in order to separate impurities from said oil by passing said oil to a reclaiming zone which is heated by said oil, in which said oil is stripped with a normally gaseous or vaporizable hydrocarbon in a preferred form by a stream of $C_3$, $C_4$ and $C_5$ hydrocarbons (propane, butane and pentane) and in which the stripped lean oil freed of contaminants and the stripping hydrocarbons are passed from the reclaiming zone to the stripping zone in which the original rich absorption medium is being stripped of the constituents absorbed therein substantially as set forth and described.

I claim:

1. A method for the purification of a stripped absorption oil which comprises passing said absorption oil from a heated stripping zone in which it has been stripped to a reclaiming zone; passing another portion of said oil into indirect heat exchange with oil in said reclaiming zone; passing a hydrocarbon stripping medium selected from the group consisting of liquefied petroleum gas, propane and butane, and mixtures of these hydrocarbons and substantially free from impurities herein mentioned, into oil in said reclaiming zone and therein stripping the absorption oil from impurities contaminating the same with aid of said hydrocarbon and then passing the stripped absorption oil and hydrocarbon stripping medium in vaporous form into said heated stripping zone.

2. A method according to claim 1 wherein the hydrocarbon is passed into heat interchange with the hot stripped absorption oil before said hydrocarbon is passed to said reclaiming zone.

3. An apparatus comprising, in combination, a stripping vessel, a heating vessel, a reclaiming vessel, means associated with said stripping vessel and said heating vessel to circulate liquid from said stripping vessel to said heating vessel and back again to said stripping vessel, means associated with said stripping vessel and said reclaiming vessel to pass at least a portion of liquid from the bottom of said stripping vessel into indirect heat exchange with the bottom of said reclaiming vessel, means associated with said stripping vessel and said reclaiming vessel to pass at least another portion of liquid in said stripping vessel into said reclaiming vessel, means associated with said reclaiming vessel for passing a stripping medium into said reclaiming vessel and means for passing vapors from said reclaiming vessel to said stripping vessel.

4. A method for the recovery of gasoline constituents from a hydrocarbon gas containing the same and impurities which tend to build up in an absorption oil which is used which comprises contacting said gas with an absorption oil, under conditions of absorption, to cause absorption of the gasoline constituents and unavoidably some of said impurities into said absorption oil; heating said oil containing said gasoline constituents; passing said heated absorption oil containing said gasoline constituents into a stripping zone; in said stripping zone, stripping from said heated absorption oil said gasoline constituents; returning a portion of stripped absorption oil to said contacting; passing a portion of stripped absorption oil containing impurities to a reclaiming zone; in said reclaiming zone, heating and stripping said absorption oil, therein employing a normally gaseous stripping medium substantially free from said impurities consisting of at least one member selected from the group consisting of LPG, propane and butane, and a mixture of these gases; obtaining from said reclaiming zone a mixture of purified absorption oil vapor and stripping medium; then passing the last-mentioned mixture into said stripping zone, and recovering as an absorbent from said stripping zone, with said gasoline constituents, which are therein stripped from said heated absorption oil, said stripping medium and any additional gasoline constituents which were contained in the stripped absorption oil and which are released therefrom in the reclaiming zone.

5. An apparatus comprising in combination an absorber vessel, a stripping vessel, a heating vessel, a reclaiming vessel, means associated with said absorbing vessel to feed an absorbing medium thereto, means associated with said absorber vessel to feed a gas thereto, means associated with said absorber and said stripper vessels to pass rich absorbing medium from said absorber vessel to said stripping vessel, means associated with said stripping vessel and said heating vessel to circulate liquid from said stripping vessel to said heating vessel and from said heating vessel back again to said stripping vessel, means associated with said stripping vessel and said reclaiming vessel to pass at least a portion of liquid from the bottom of said stripping vessel into indirect heat exchange with the bottom of said reclaiming vessel, means associated with said stripping vessel and said reclaiming vessel to pass at least another portion of liquid in said stripping vessel into said reclaiming vessel, means associated with said reclaiming vessel for passing a stripping medium into said reclaiming vessel, means for passing vapors from said reclaiming vessel to said stripping vessel, and means associated with said stripping vessel to pass at least a portion of liquid from the bottom of said stripping vessel as said absorbing medium to said absorber vessel.

References Cited in the file of this patent
UNITED STATES PATENTS

| | | |
|---|---|---|
| 2,339,680 | Carney | Jan. 18, 1944 |
| 2,726,191 | Mannas | Dec. 6, 1955 |
| 2,913,374 | Van Ackeren et al. | Nov. 17, 1959 |
| 2,930,752 | Swerdloff | Mar. 29, 1960 |